United States Patent
Kunz

(10) Patent No.: US 9,471,198 B2
(45) Date of Patent: Oct. 18, 2016

(54) FLIP-THROUGH PRESENTATION OF A LIST

(71) Applicant: Andreas Kunz, Heidelberg (DE)

(72) Inventor: Andreas Kunz, Heidelberg (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 13/904,561

(22) Filed: May 29, 2013

(65) Prior Publication Data
US 2014/0359527 A1 Dec. 4, 2014

(51) Int. Cl.
*G06F 3/048* (2013.01)
*G06F 3/0482* (2013.01)
*G06F 3/0488* (2013.01)
*G06F 3/0484* (2013.01)

(52) U.S. Cl.
CPC ......... *G06F 3/0482* (2013.01); *G06F 3/04842* (2013.01); *G06F 3/04886* (2013.01); *G06F 2203/04808* (2013.01)

(58) Field of Classification Search
CPC ........................ H04N 5/44543; G06F 9/4443
USPC .................................. 715/810, 786, 776, 830
See application file for complete search history.

(56) References Cited

U.S. PATENT DOCUMENTS

| | | | |
|---|---|---|---|
| 6,757,673 B2 | 6/2004 | Makus et al. | |
| 6,853,912 B2 | 2/2005 | Han | |
| 7,133,859 B1 | 11/2006 | Wong | |
| 7,469,381 B2 | 12/2008 | Ording | |
| 7,958,456 B2* | 6/2011 | Ording | G06F 3/0481 715/784 |
| 8,171,429 B2* | 5/2012 | Bollman | G06F 3/048 700/103 |
| 8,253,705 B2 | 8/2012 | Vuong et al. | |
| 8,276,059 B2 | 9/2012 | Busse et al. | |
| 8,412,278 B2 | 4/2013 | Shin et al. | |
| 8,694,910 B2* | 4/2014 | Lambourne | G06F 3/04855 715/712 |
| 8,751,956 B2* | 6/2014 | Wilairat | G06F 3/04855 715/786 |
| 8,806,380 B2* | 8/2014 | Moon | G06F 3/0482 715/786 |
| 2005/0149977 A1 | 7/2005 | Nakamura et al. | |
| 2006/0095845 A1 | 5/2006 | Leeuwen | |
| 2008/0086703 A1 | 4/2008 | Flynt et al. | |
| 2009/0002335 A1* | 1/2009 | Chaudhri | 345/173 |
| 2009/0254866 A1 | 10/2009 | Kugle et al. | |

(Continued)

OTHER PUBLICATIONS

Hena Mau et al., U.S. Appl. No.: 13/759,500, filed Feb. 5, 2013 entitled: Page Control for Enterprise Mobile Applications; 27 pages.
Cover Flow, http://en.wikipedia.org/w/index.php?title=Cover_Flow?oldid=552457338 (last visited May 28, 2013).

*Primary Examiner* — Kieu Vu
*Assistant Examiner* — Joy M Weber
(74) *Attorney, Agent, or Firm* — Fish & Richardson P.C.

(57) ABSTRACT

The disclosure generally describes computer-implemented methods, software, and systems for presenting list information. One method includes providing a series of controls for presentation representing a complete set of the elements, including first and last elements that are accessible without paging or scrolling to another screen. User input is received representing a traversal of the controls, including an uninterrupted selection of the controls. During the traversal and depending on a current position of the user input in relation to the controls, a position marker is displayed and continuously updated that identifies at least one element associated with a control at the current position. User input is received during the traversal indicating a selection of a particular control based on a termination of user input. The selection is based on a position relative to the series of controls. At least one particular element associated with the selected particular control is identified.

21 Claims, 12 Drawing Sheets

(56) References Cited

U.S. PATENT DOCUMENTS

| | | | |
|---|---|---|---|
| 2011/0167369 A1* | 7/2011 | van Os | G06F 3/0483 715/769 |
| 2012/0023438 A1 | 1/2012 | Xia et al. | |
| 2012/0124505 A1* | 5/2012 | St. Jacques, Jr. | G06F 3/0483 715/776 |
| 2012/0159393 A1 | 6/2012 | Sethi | |
| 2013/0002585 A1* | 1/2013 | Jee | G06F 3/0488 345/173 |
| 2013/0080975 A1 | 3/2013 | Geithner | |
| 2013/0321340 A1* | 12/2013 | Seo et al. | 345/174 |
| 2014/0123068 A1 | 5/2014 | Chan | |

* cited by examiner

FLIP-THROUGH PRESENTATION OF A LIST

TECHNICAL FIELD

The present disclosure relates to computer-implemented methods, software, and systems for presenting list information.

BACKGROUND

Different methods can be used to present information to users on the Internet or in applications. However, screen limitations on various types of computer devices can limit the amount of information presented at one time. For example, when viewing a web page, the user may have to scroll or page repeatedly to view more than the first page and to navigate to portions of interest on the web page.

Some computer devices, such as mobile phones and tablet computers, can provide touch input capabilities that allow the user to interact with displayed information with the press of a finger or in other ways. Mobile phones, for example, can have small screens, or the window in which information is displayed may be small relative to the screen, which can limit the amount of information presented to the user at one time.

SUMMARY

The disclosure generally describes computer-implemented methods, software, and systems for providing instructions for presenting list information. As an example, a list of elements for presentation is identified. A series of controls is provided for presentation representing a complete set of the elements. The complete set includes at least first and last elements in the list of elements that are accessible without paging or scrolling to another screen. User input is received on the presented series of controls representing a traversal of the series of controls. The user input includes an uninterrupted selection of at least part of the series of controls. During the traversal and depending on a current position of the user input in relation to the series of controls, a position marker is displaying and continuously updated to identify at least one element associated with a control at the current position. User input is received during the traversal indicating a selection of a particular control from the series of controls based on a termination of user input. The selection of the particular control is based on a position relative to the series of controls represented by the user input. At least one particular element associated with the selected particular control is identified. Upon identification of the element(s), an operation can then be performed, such as to display detailed information for a single element, or present selected plural elements for a repeat of the selection process.

The present disclosure relates to computer-implemented methods, software, and systems for providing instructions for presenting a list. One computer-implemented method includes: identifying a list of elements for presentation; providing a series of controls for presentation representing a complete set of the elements, the complete set including at least first and last elements in the list of elements that are accessible without paging or scrolling to another screen; receiving user input on the presented series of controls representing a traversal of the series of controls, the user input including an uninterrupted selection of at least part of the series of controls; during the traversal and depending on a current position of the user input in relation to the series of controls, displaying and continuously updating a position marker identifying at least one element associated with a control at the current position; receiving user input during the traversal indicating a selection of a particular control from the series of controls based on a termination of user input, the selection of the particular control based on a position relative to the series of controls represented by the user input; and identifying at least one particular element associated with the selected particular control.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, the user input is provided using a maintained touch input.

In a second aspect combinable with any of the previous aspects, the series of controls are vertical lines, and the traversal occurs substantially horizontally.

In a third aspect combinable with any of the previous aspects, the user input representing the traversal of the series of controls is a drag operation, and wherein the termination is a release operation.

In a fourth aspect combinable with any of the previous aspects, the user input is provided using touch input, and wherein the release operation is a finger lift that signals an end to the traversal, the method further comprises receiving additional touch input of the particular control representing a subsequent user selection of the particular control, and presenting detailed information associated with at least one element associated the selected particular control.

In a fifth aspect combinable with any of the previous aspects, the selection of a particular control from the series of controls is based, at least in part, on techniques that determine an intended user selection using touch input and based on position and time.

In a sixth aspect combinable with any of the previous aspects, the position marker identifies a group of elements associated with the current position, and the method further comprises, in response to the received user input indicating the selection of the particular control: providing a second series of controls representing a subset of the elements based on the prior selection; receiving user input on the presented second series of controls representing a traversal of the second series of controls, the user input including an uninterrupted selection of at least part of the second series of controls; during the traversal of the second series of controls and depending on a second current position of the user input in relation to the second series of controls, displaying and continuously updating a second position marker identifying at least one element associated with a control at the second current position; receiving user input during the traversal indicating a selection of a second particular control from the second series of controls based on a termination of user input, the selection of the second particular control based on a second position relative to the second series of controls represented by the user input; and identifying at least one particular element associated with the selected second particular control.

In a seventh aspect combinable with any of the previous aspects, providing the series of controls representing the complete set of the elements includes selecting a number of controls to be presented in the series of controls based at least in part on a number of elements in the complete set of elements and display capabilities of a device on which the series of controls are to be displayed.

In an eighth aspect combinable with any of the previous aspects, providing the series of controls representing the complete set of the elements includes providing controls in two dimensions, wherein a first dimension represents a first attribute of the elements and a second dimension represents a second attribute of the elements, wherein traversal of the controls occurs in two dimensions, and wherein user selection of a particular control from the series of controls causes the identification of at least one particular element associated with the selected particular control based on the first and second dimensions.

In a ninth aspect combinable with any of the previous aspects, the position marker includes primary information displayed in a first way and secondary information displayed in a second way, wherein the primary information is associated with the element and matches information for at least one adjacent element in the list of elements, and wherein the secondary information associated with the element does not match information for at the least one adjacent element.

In a tenth aspect combinable with any of the previous aspects, the series of controls includes annotations that describe and represent groupings of elements associated with the controls, each annotation describing and representing a different grouping of the groupings.

In an eleventh aspect combinable with any of the previous aspects, the annotations include color-coding of one or more sets of controls, the color-coding based on common characteristics shared by elements associated with different subsets of elements associated with controls within the series The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for presenting list information. For example, a list of elements can be presented using a series of controls representing the entire list. A user can use touch input to interact with the presented list, including using touch input to traverse the list and make a selection of a control representing an element. The traversal and selection can occur, for example, without requiring the user to page or scroll to other screens or pages of list information. In some implementations, it is possible for the user to quickly select any one of the first, last, or any intermediate element in the list.

The subject matter described in this specification can be implemented in particular implementations so as to realize one or more of the following advantages. First, list information is presented for an entire list without requiring the user to page or scroll through the list. Second, the presentation of the list is automatically adapted to a computer device based on the number of elements in the list and the display capabilities of the computer device.

Figure 1:
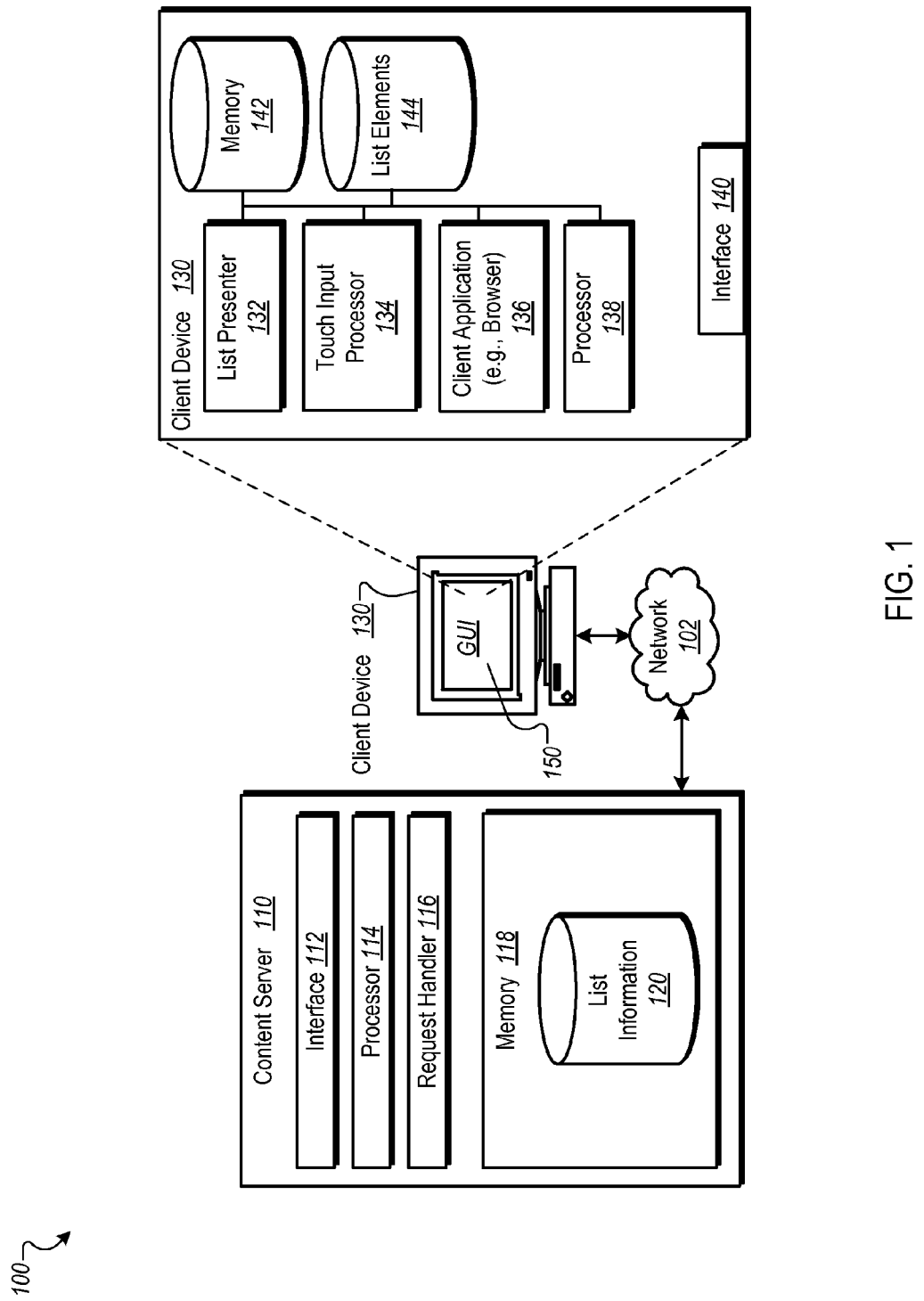
FIG. 1 illustrates an example environment for providing list information using a leaf-through presentation.

FIG. 1 illustrates an example environment 100 for providing list information using a leaf-through presentation. Specifically, the illustrated environment 100 includes at least one content server 110, and at least one client device 130, all of which are communicably coupled using a network 102. For example, a user interacting with a user interface presented on the client device 130 may view content (e.g., list information) provided by the content server 110. In another example, the user may be presented the list information using data already present on the client device 130.

The content server 110 comprises an electronic computing device operable to provide list information 120. The list information may be provided to one or more client devices 130, e.g., for presentation of list information used in browsers, on web pages, or for other purposes.

As used in the present disclosure, the term "computer" is intended to encompass any suitable processing device. For example, although FIG. 1 illustrates a single content server 110, the environment 100 can be implemented using two or more content servers 110. The environment 100 can also be implemented using computers other than servers, including a server pool. Indeed, components of the environment 100 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated components of the environment 100 may be adapted to execute any operating system, including Linux, UNIX, Windows, Mac OS®, Java™, Android™, iOS or any other suitable operating system. According to some implementations, components of the environment 100 may also include, or be communicably coupled with, an e-mail server, a Web server, a caching server, a streaming data server, and/or other suitable server(s). In some implementations, components of the environment 100 may be distributed in different locations and coupled using the network 102.

The content server 110 includes an interface 112, a processor 114, a request handler 116, and a memory 118. The interface 112 is used by the content server 110 for communicating with other systems in a distributed environment, connected to the network 102 (e.g., the client device 130), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The request handler 116 can, for example, handle requests for content received from systems and/or devices external to the content server 110. For example, the request handler 116 can handle a request received from the client device 130 for list information 120, such as a list of elements to provide a leaf-through presentation of the list on the client device 130. In response to the request, the request handler 116 can provide the requested list information 120 responsive to the request.

A list presenter 132 at the client device 130 can present a leaf-through version of a list. For example, the list presenter 132 can perform the processing at the client device 130 that is needed to present the list using list elements 144 stored locally and/or list information received from the content server 110. To present the list, for example, the list presenter 132 can provide a series of controls on the client device 130. The controls can collectively represent the entire list and allow the user to use touch input to traverse (and make selections from) the list. Each control can represent one or more elements. For example, the first control in the series of controls can represent at least the first element in the list, and the last control in the series of controls can represent at least the last element in the list. Because the series of controls represent the entire list, there is no need for the user to page or scroll to another screen to access additional entries. The list presenter 132 can also make adjustments to what the user sees regarding the list while the user in interacting with the presented list. For example, during a traversal of the list and depending on a current position of the user input in relation to the series of controls, the list presenter 132 can display and continuously update a position marker. The position marker can identify at least one element associated with a control at the current position, e.g., the last name of a person associated with an entry in an address book.

A touch input processor 134 at the client device 130 can process touch input provided by the user while interacting with the list. For example, the touch input processor 134 can determine when the user first interacts with the list, e.g., by initially touching a particular control in the series of controls representing the list. The touch input processor 134 can also determine when the user is traversing the list, e.g., by touch-sliding along the controls, or when the user has selected a particular control. The term touch-sliding, when used herein, can refer to an operation that is similar to a drag operation, except no object is dragged to a new location. Instead, touch-sliding can keep the series of controls in focus as the user touch-slides across the controls to arrive at a particular control. The touch input processor 134 can also determine when the user has terminated the traversal of the list in order to signal that a selection has been made.

The content server 110 also includes the memory 118, or multiple memories 118. The memory 118 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the content server 110. Additionally, the memory 118 may include any other appropriate data, such as VPN applications, firmware logs and policies, firewall policies, a security or access log, print or other reporting files, as well as others. In some implementations, memory 118 includes the list information 120 (described above). Other components within the memory 118 are possible.

The illustrated environment of FIG. 1 also includes the client device 130, or multiple client devices 130. The client device 130 may be any computing device operable to connect to, or communicate with, at least the content server 110 over the network 102 using a wire-line or wireless connection. In general, the client device 130 comprises an electronic computer device operable to receive, transmit, process, and store any appropriate data associated with the environment 100 of FIG. 1.

The illustrated client device 130 further includes at least one client application 136. The client application 136 can be any type of application that allows the client device 130 to request and view content on the client device 130. In some implementations, the client application 136 can include a Web browser or any other application that may display or use content. In some implementations, the client application 136 can use parameters, metadata, and other information received at launch to access a particular set of data received from the content server 110. Once a particular client application 136 is launched, a user may view and interact with content presented on the client device 130. In some implementations, the client application 136 can access or include the list presenter 132.

The illustrated client device 130 further includes an interface 140, a processor 138, and a memory 142. The interface 140 is used by the client device 130 for communicating with other systems in a distributed environment— including within the environment 100—connected to the network 102, e.g., the content server 110, as well as other systems communicably coupled to the network 102 (not illustrated). Generally, the interface 140 comprises logic encoded in software and/or hardware in a suitable combination and operable to communicate with the network 102. More specifically, the interface 140 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including JavaScript™, Hyper-Text Mark-up Language (HTML), C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 130 includes the processor 138. Although illustrated as the single processor 138 in FIG. 1, two or more processors 138 may be used according to particular needs, desires, or particular implementations of the environment 100. Each processor 138 may be a central processing unit (CPU), an application specific integrated circuit (ASIC), a field-programmable gate array (FPGA), or another suitable component. Generally, the processor 138 executes instructions and manipulates data to perform the operations of the client device 130. Specifically, the processor 138 executes the functionality required to send requests to, and process responses from, and the content server 110.

The illustrated client device 130 also includes a memory 142, or multiple memories 142. The memory 142 may include any memory or database module and may take the form of volatile or non-volatile memory including, without limitation, magnetic media, optical media, random access memory (RAM), read-only memory (ROM), removable media, or any other suitable local or remote memory component. The memory 142 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 130. Additionally, the memory 142 may include any other appropriate data, such as VPN applications, firmware logs and policies, firewall policies, a security or access log, print or other reporting files, as well as others.

The illustrated client device 130 is intended to encompass any computing device such as a smart phone, tablet computing device, PDA, desktop computer, laptop/notebook computer, wireless data port, one or more processors within these devices, or any other suitable processing device. For example, the client device 130 may comprise a computer that includes an input device, such as a keypad, touch screen, or other device that can accept user information, and an output device that conveys information associated with the client device 130, including digital data, visual information, or a graphical user interface (GUI) 150, as shown with respect to and included by the client device 130. The GUI 150 interfaces with at least a portion of the environment 100 for any suitable purpose, including generating a visual representation of a Web browser and displaying and receiving user inputs for a leaf-through presentation of a list (e.g., an address book).

Figure 2A:
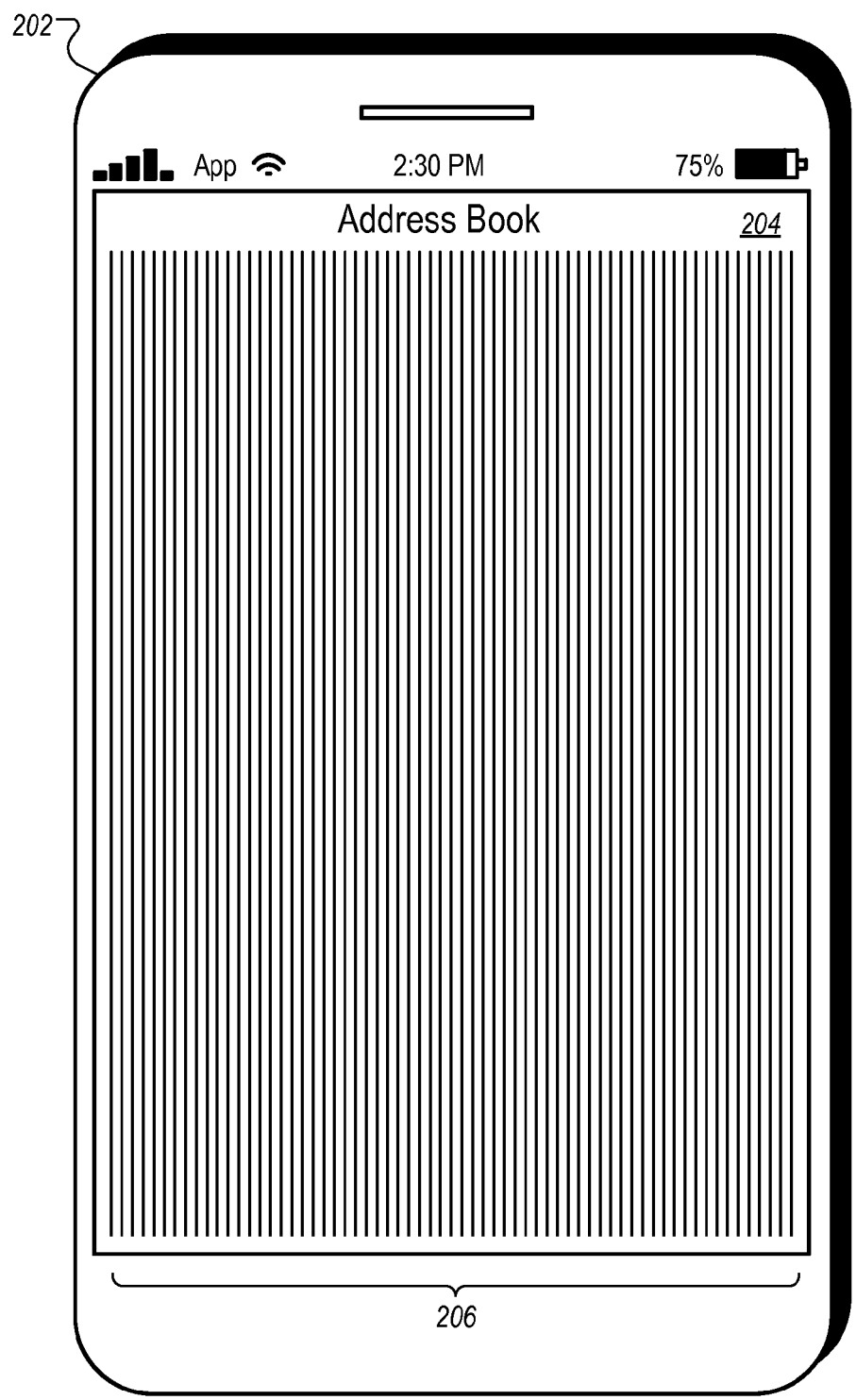
FIG. 2A shows an example address book displayed on a computer device.

FIG. 2A shows an example address book 204 displayed on a computer device 202. Entries in the address book are represented by a series of controls 206, shown here as a series of vertical lines that represent all of the pages of an address book. In alternative instances, the controls 206 may be represented by a series of horizontal lines, a series of differing colors, or any other suitable representation. As will be described in detail below, touch input can be used by a user to interact with the address book, e.g., to look up an address associated with a particular name. The interaction can be done without paging or scrolling, as the entire address book is already displayed and available for searching using the series of controls 206. For example, using touch input, the user can touch the series of controls 206 in any location, then slide in different directions. As this traversal by the user of the series of controls 206 occurs, "peek" information for a control most directly under the user's touch input is displayed, such as to represent the user "peeking" into a page of the complete address book 204.

In this example, there can be one vertical line for each entry in the address book, or a single vertical line can represent multiple address book entries. The number of lines chosen to represent the address book can depend, for example, on the number of entries in the address book and the display area available to present the address book to the user. When a single line represents one entry, for example, selecting the line can cause the single entry to be identified, e.g., for other purposes, such as to display detailed information for the corresponding address book entry. When a single line represents multiple entries, as will be described in detail below, additional steps can be used to narrow the selection to a single entry.

In some implementations, the number of lines chosen can be selected based on known aspects for user interaction with the method of presenting the elements, such as the series of controls 206 represented as vertical lines. The aspects can include ease-of-use, intuitive use of controls, selection rates, and/or other measures of a positive user experience. As a result, the number of lines chosen can correspond to a spacing (e.g., 1/16 to 1/8 inch) that is large enough to be manageable for user interaction but still allows for displaying enough lines to provide more choices for the user.

In some implementations, fewer lines than shown in FIG. 2A can be used to represent the address book, e.g., if the address book has very few entries. For example, if only ten entries exist in the address book 204, then ten vertical lines can be used to represent the address. In some implementations, when fewer entries exist, then thicker lines can be used for the vertical lines that are used for the series of controls 206.

While an address book is used herein as the primary example of a list presented in this way, other lists can also be presented to the user in this or similar ways. Further, entries can be represented as vertical lines representing the pages of a book, or entries can be presented as a stack of horizontal lines, e.g., representing an inbox, a stack or group of reports, a stack or group of folders, a listing of music files, a listing of documents, date-based information, or some other group of entries or objects. In some implementations, users can be provided with the option to specify settings and/or preferences as to how lists are to be presented, e.g., on a per-list basis, including preferred line spacing, vertical or horizontal presentation, or other settings. In some implementations, determining how a list is to be presented can occur in real-time, e.g., vertically or horizontally, based on the display or window space, the list size, the type of data in the list, and/or other considerations.

Figure 2B:
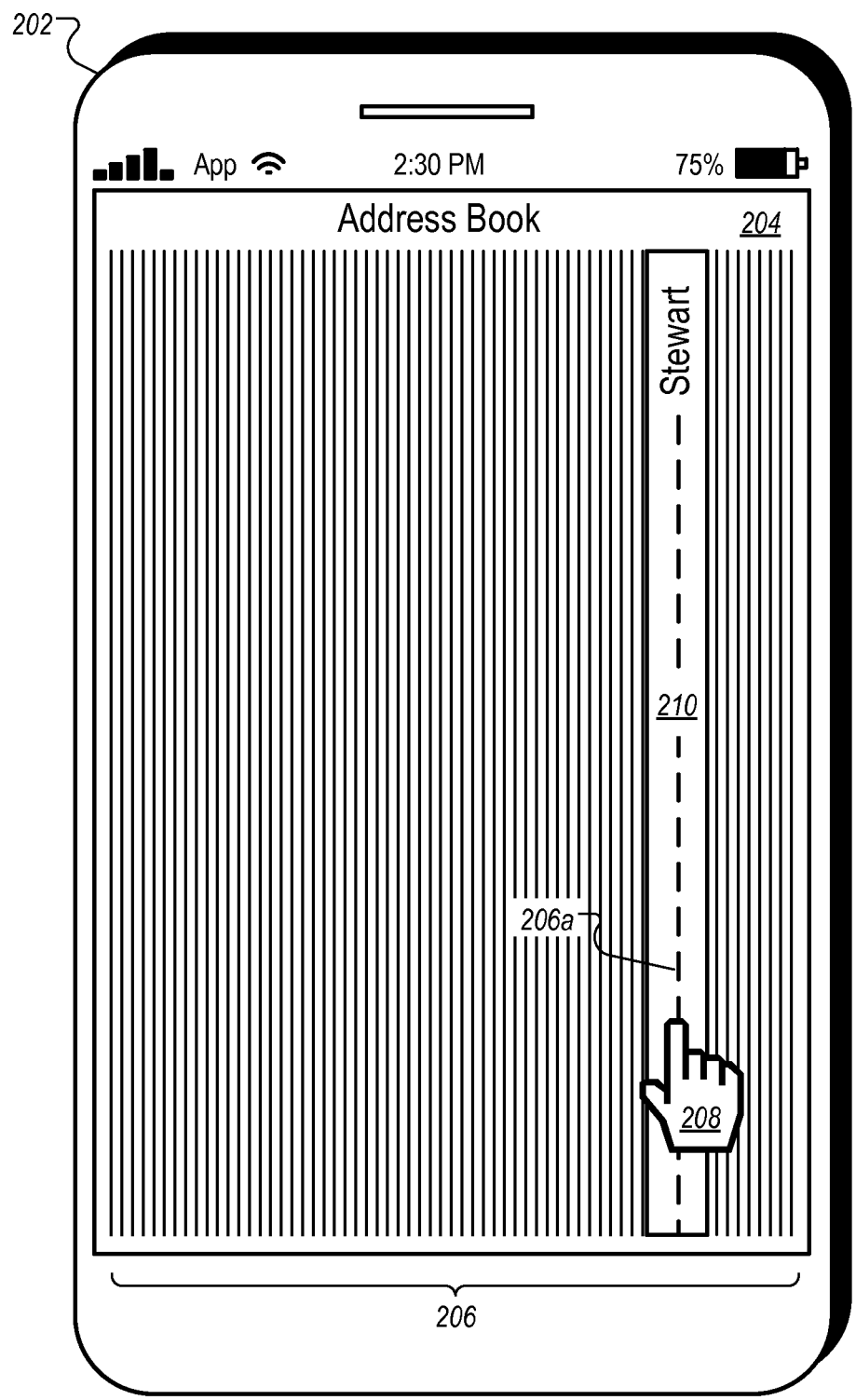
FIG. 2B shows the address book with a particular control selected.

FIG. 2B shows the address book 204 with a particular control 206a selected. In this example, the particular control 206a is represented as a dashed line that is selected using touch input 208. Dashed lines, as used herein, are generally not visible to the user. As a result of the selection of the particular control 206a, a position marker 210 marks the position within the series of controls and displays peek information for the element associated with the particular control 206a. In this example, the peek information is the last name "Stewart" which can correspond to information that a user can see when scanning last names, e.g., that can be visible when leafing through a physical address book. The user who has selected the particular control 206a may have previously seen other last names displayed in the position marker 210. For example, while touch-sliding to traverse the series of controls 206, e.g., to the left of the particular control 206a, the user may have seen other last names displayed in the position marker 210 that appear alphabetically before "Stewart." In another example, the user may have arrived at the particular control 206a while traversing the series of controls 206 to the right of the particular control 206a, e.g., representing elements for address book entries having last names that follow "Stewart" alphabetically. In yet another example, the display shown in FIG. 2B can occur if the initial touch input 208 by the user happens to land on the particular control 206a associated with "Stewart." As the user touch-slides to the left or right along the series of controls 206, the last name displayed in the position marker 210 changes automatically, e.g., depending on which of the underlying particular one of the series of controls 206 is selected.

While touch input 208 is indicated using a hand-shaped, pointed-finger cursor, the intent is to indicate that the touch input 208 can be accomplished using a user's finger touching the touch screen of a computer device, e.g., the computer device 202. In some implementations, the touch input described herein can be replaced using a mouse and cursor system, a touch pad (e.g., on a laptop computer), or some other way in which touch input can be represented and processed, or the same or similar controls can be used.

In this example, if too many address book 204 entries exist so that each particular address book entry cannot have its own dedicated one of the series of controls 206, then the particular control 206a can correspond to a group or range of elements. As such, the position marker 210 can display a range of names (e.g., FIG. 2C). Each one of the series of controls 206 in this example would correspond to a range of elements. As an example, if the particular control 206a is selected in the position shown in FIG. 2B, then the position marker 210 can display a range of last names, e.g., "Stanley-Talent" or some other range that may include the user's intended selection of "Stewart."

Figure 2C:
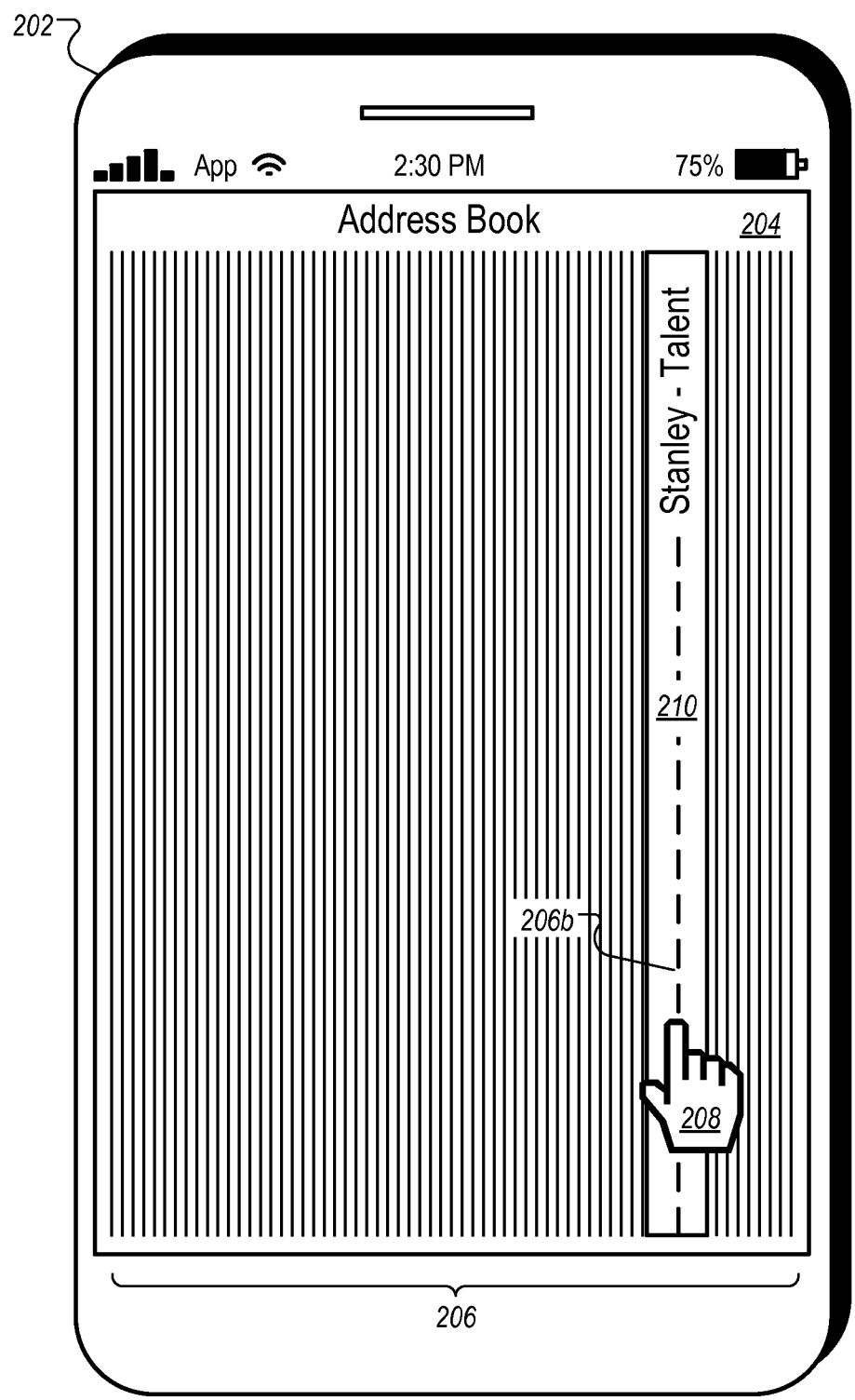
FIG. 2C shows an example of the address book with a particular control selected that represents a range of elements.

FIG. 2C shows an example of the address book 204 with a particular control 206b selected that represents a range of elements. In this example, the particular control 206b that is currently selected corresponds to a range of elements (e.g., "Stanley-Talent") as identified in the position marker 210. During traversal of the series of controls 206, the user may decide to touch-slide to this entry, for example, because the range "Stanley-Talent" includes an entry that the user wants to view (e.g., "Stewart").

Figure 2D:
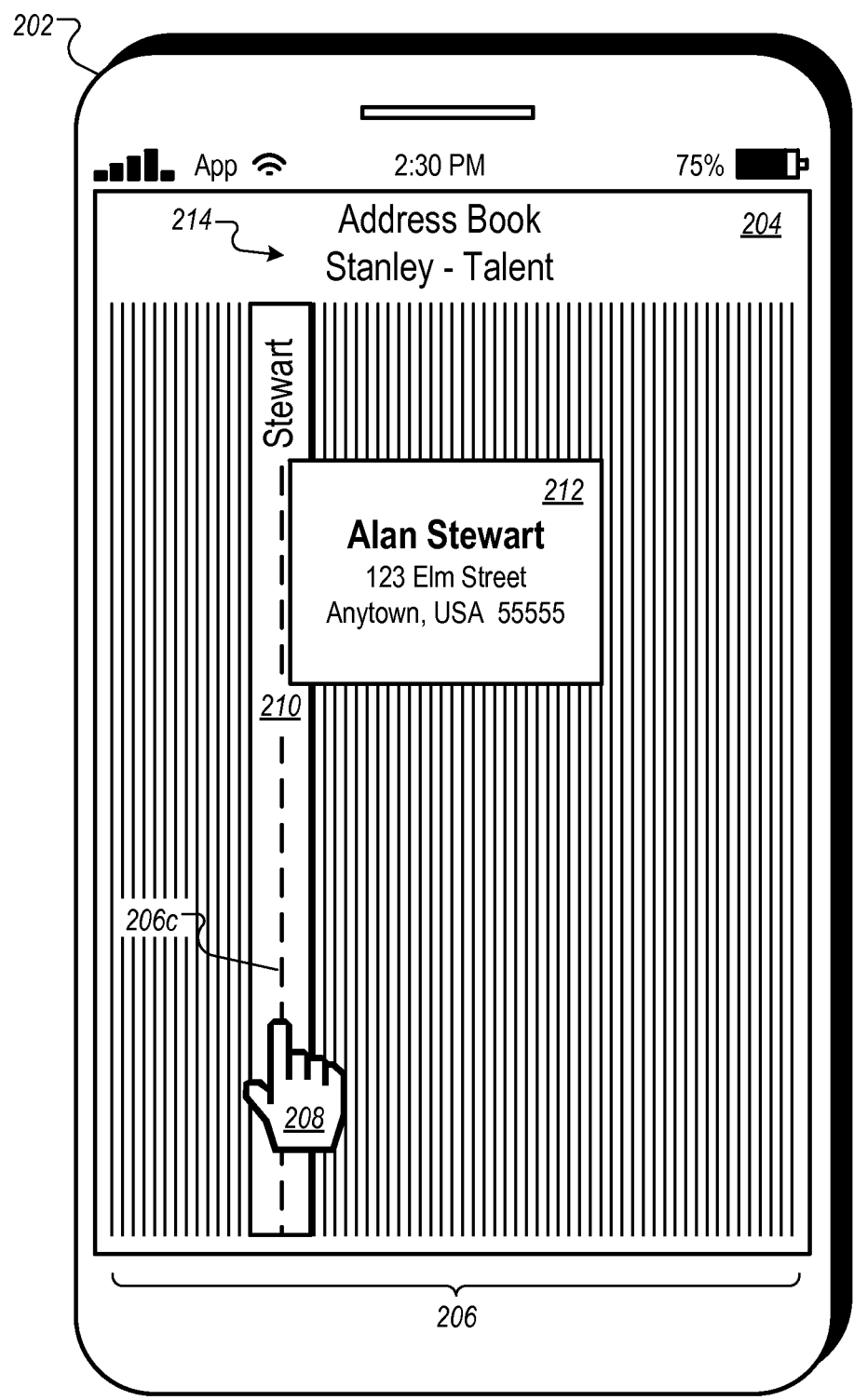
FIG. 2D shows an example of the address book for which one level of selection has occurred.

FIG. 2D shows an example of the address book 204 for which one level of selection has occurred. For example, the series of controls 206 can correspond to entries having the last names "Stanley" through "Talent," such as if the user has selected the particular control 206b as described with reference to FIG. 2C. In some implementations, a title 214 can be used and modified during different levels of the user selection process to describe which elements (e.g., "Stanley-Talent") correspond to the address book 204 or a user-selected subset thereof. In the example shown, the user can select the particular control 206c, e.g., corresponding to the address book entry for "Stewart." In this example, the control for "Stewart" is in a different place from that shown in FIG. 2B because the "Stewart" entry appears in a different position relative to the entire address book (e.g., FIG. 2B) versus the portion of the address book 204 (e.g., FIG. 2D).

This example also shows example detailed information area 212 corresponding to the selected particular control 206c. For example, after touch-sliding to the particular control 206c, the user can terminate the input (e.g., by lifting the finger doing the sliding) and then touch-tap in or near the position marker 210 in order to display the detailed information area 212.

In some implementations, controls can be added, such as inside the detailed information area 212, by which the user can navigate to a previous entry or a next entry. For example, the user may have hastily selected the particular control 206c and inadvertently selected "Stewartson" while intending to select "Stewart" instead. By selecting a previous control, such as by touch-taping along the left edge of the detailed information area 212, the previous entry corresponding to "Stewart" can be displayed. Similar or different controls can exist, including an invisible or visible control on the right side of the detailed information area 212 for navigating to the next entry.

Figure 2E:
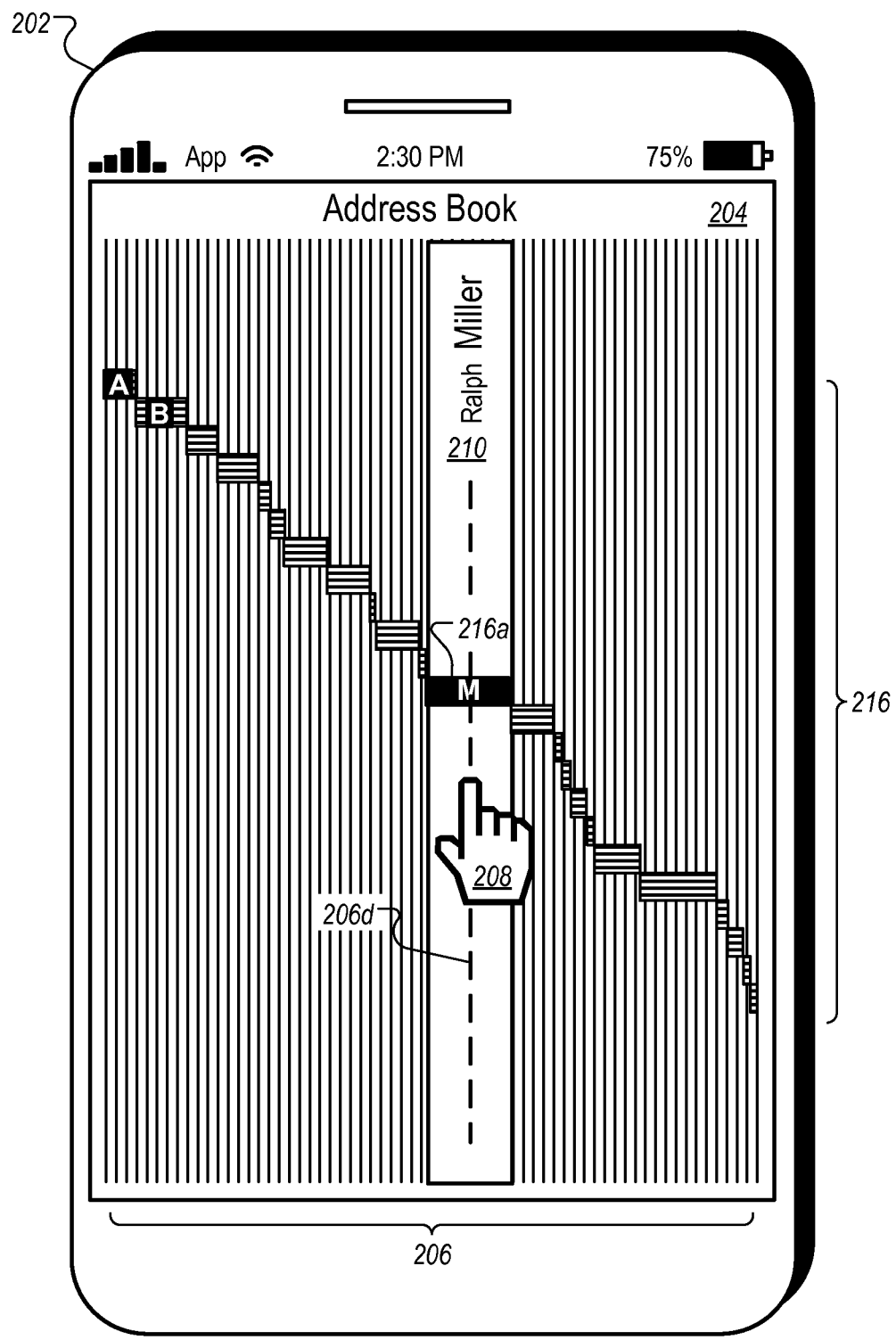
FIG. 2E shows an example of the address book that includes annotations that describe and represent groupings of elements associated with the series of controls.

FIG. 2E shows an example of the address book 204 that includes annotations 216 that describe and represent groupings of elements associated with the series of controls 206. For example, the annotations 216 can identify groupings of elements of the address book 2004 that have the same first letter of the last name. One of the annotations 216 is an annotation 216a, that describes and represents entries having the last name starting with "M." In this example, the user has selected an entry (e.g., for "Ralph Miller") within the "M" group by touch-sliding to the particular control 206d. In some implementations, some or all of the annotations 216 can be marked (e.g., "A", "B", etc.) and/or color-coded in some way. Color-coding may be of assistance if the list of elements represents a priority-based task list, where high-priority tasks are presented as red lines, and lower-priority task are green. The annotations 216 may also relate to a common characteristic of a particular set of elements, where the common characteristic represents at least a partial basis for the organization of the list.

Figure 2F:
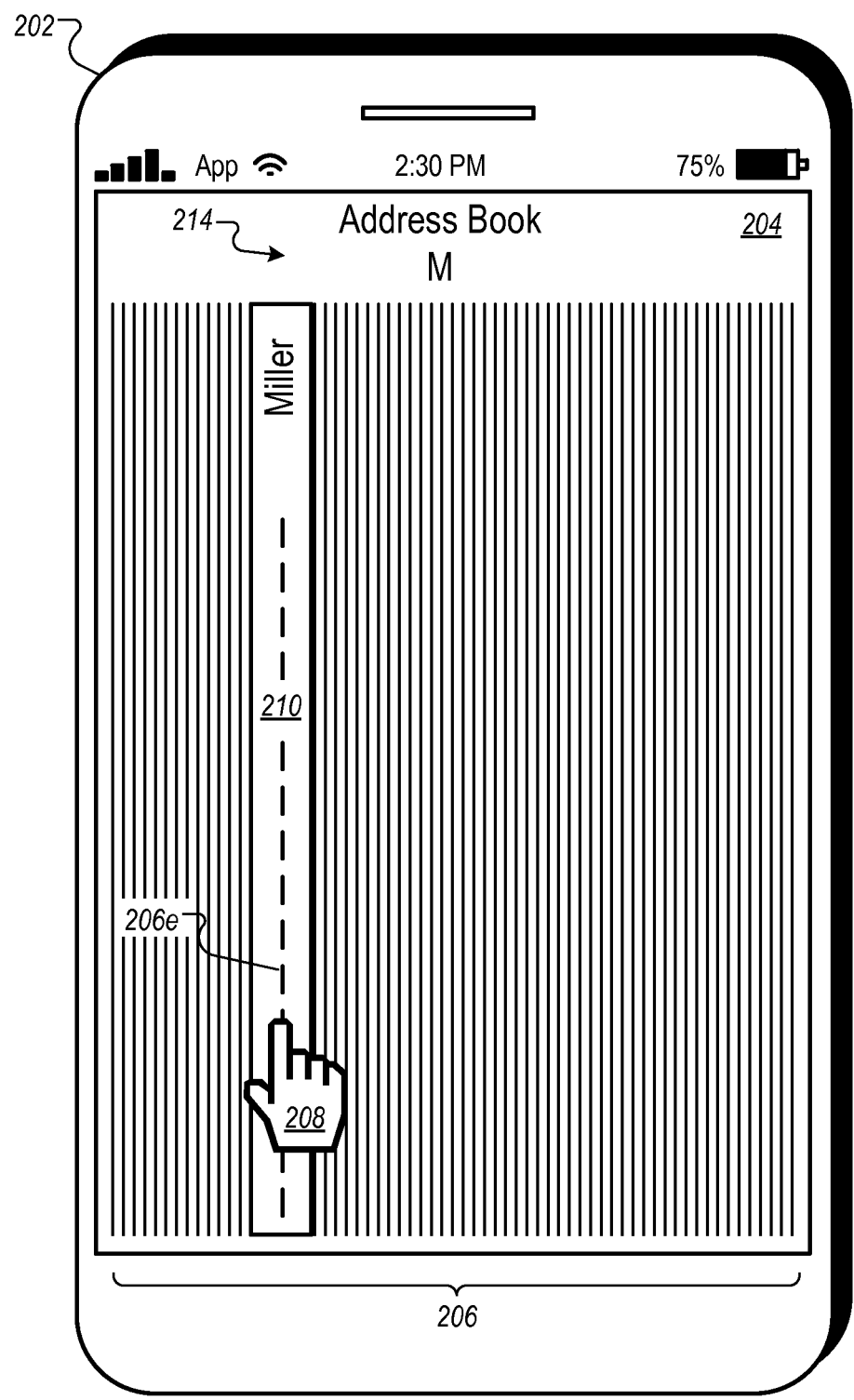
FIG. 2F shows an example of the address book displaying entries starting with the same letter.

FIG. 2F shows an example of the address book 204 displaying entries starting with the same letter. For example, this subset of the entire address book 204 can be displayed after user selection of particular control (e.g., "M") from a series of controls representing the first initials of entries. In this example, a particular control 206e is selected that corresponds to an address book entry for "Miller."

Figure 2G:
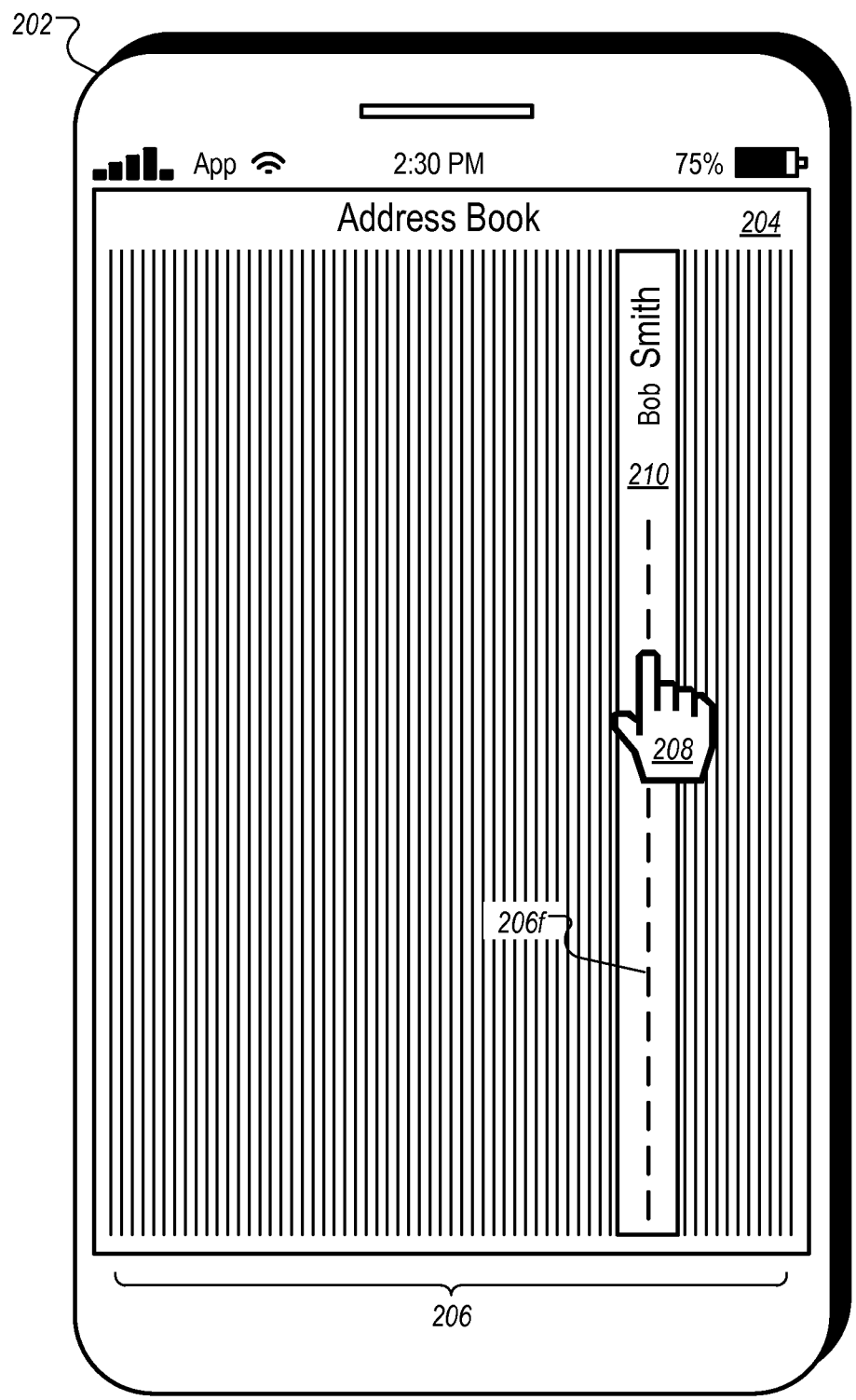
FIG. 2G shows example primary information and secondary information included in the position marker.

FIG. 2G shows example primary information and secondary information included in the position marker 210. For example, as shown, a particular control 206f is selected. The corresponding position marker 210 can indicate that the address book 204 can include entries having identical primary information (e.g., the same last name "Smith") and potentially different secondary information (e.g., the first name "Bob"). The primary information (e.g., "Smith") can be displayed, for example, in one way, such as using a large font. To contrast with the primary information, the secondary information (e.g., "Bob") can be displayed in a second way, e.g., using a smaller font, a grayed-out font, a different color, or in some other way. In some implementations, when primary and secondary information are not enough to identify the position marker 210, tertiary and/or additional information can be included in the position marker 210. In some implementations, additional controls (not shown) can be used by the user to disambiguate entries. In some implementations, displaying the secondary information can occur on an as-needed basis, e.g., when it is determined that different secondary information exists for adjacent entries, or for other reasons.

Figure 2H:
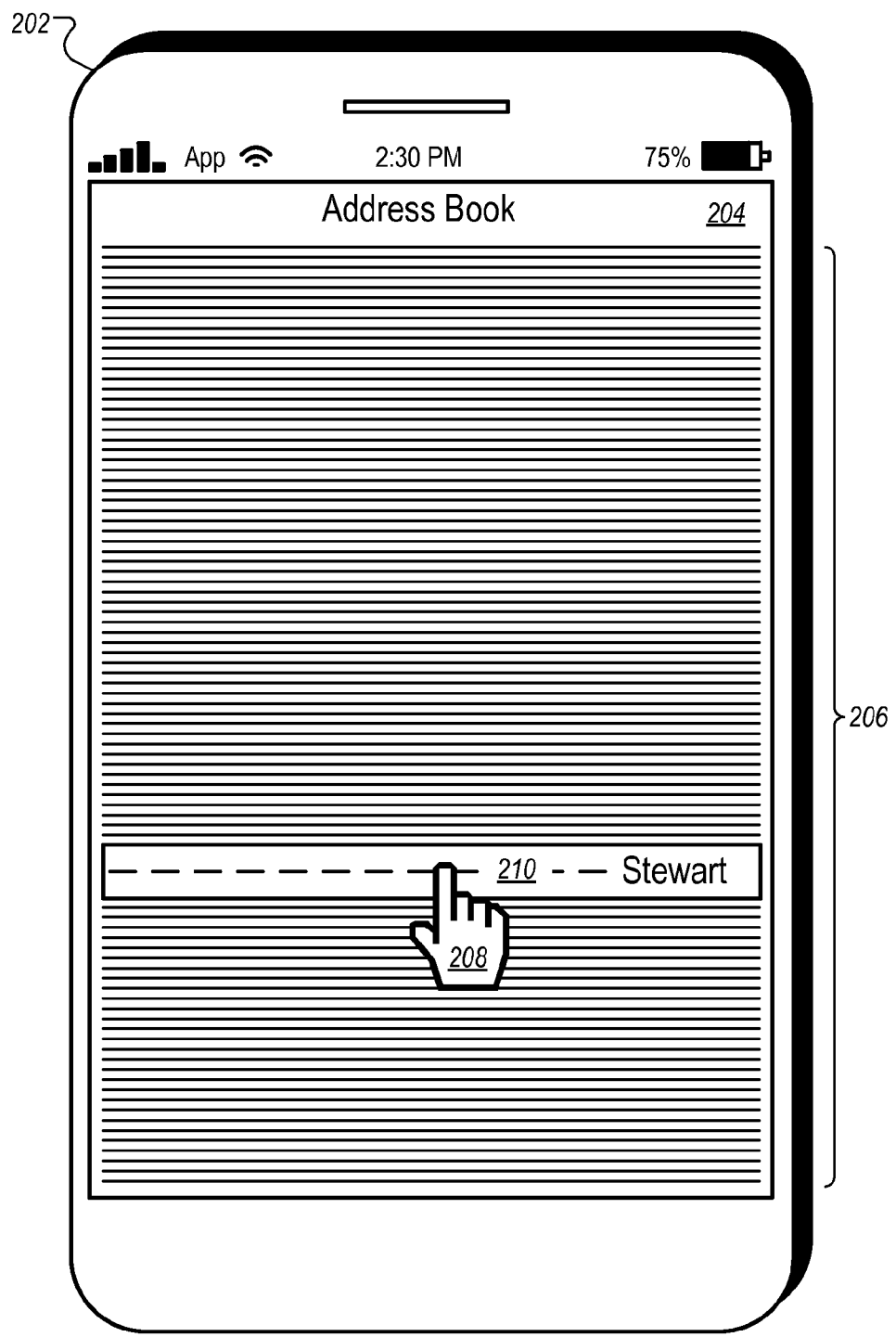
FIG. 2H shows an example of the address book in which the series of controls are arranged vertically.

FIG. 2H shows an example of the address book 204 in which the series of controls 206 are arranged vertically. In this example, the series of controls 206 includes a stack of horizontal lines that can represent an inbox, a stack of reports, or some other group of entries for which a vertical presentation as a book with pages may not be preferred. In this example, traversal of the series of controls 206 can occur using touch input 208 in substantially an up-and-down motion.

Figure 2I:
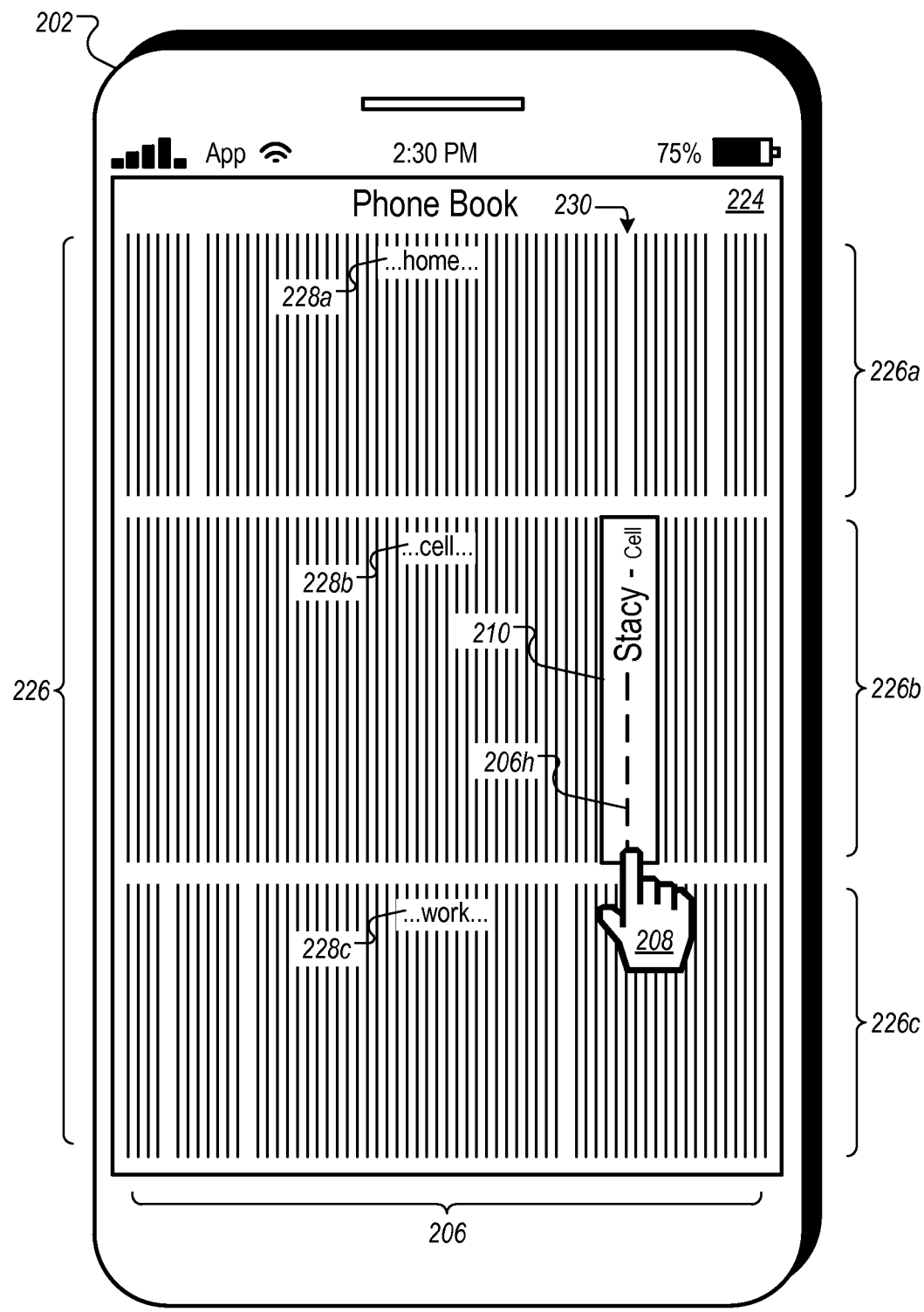
FIG. 2I shows an example of a phone book for which a series of controls allows for selection of entries in two dimensions.

FIG. 2I shows an example of a phone book 224 for which a series of controls 226 allows for selection of entries in two dimensions. In this example, the series of controls 226 is provided that represents the complete set of the elements, includes controls that are traversable in two dimensions. The first dimension in this example is horizontal, representing a first attribute of the elements, e.g., a name (e.g., Stacy) associated with the phone book entry. The second dimension in this example is vertical, representing a second attribute of the elements, such as the type of phone (e.g., home, cell, work, etc.). In this example, the user can traverse the controls in two dimensions, e.g., horizontally to select a name, and vertically to select a type of phone. For example, controls 226a, 226b and 226c can be used to select a phone book entry for home phones, cell phones, and work phones, respectively, for any name selected in the horizontal direction. User selection of a particular control (e.g., 206h) from the series of controls 226 can result in the identification (e.g., by the touch input processor 134) of at least one particular element associated with the selected particular control based on the first and second dimensions. For example, by selecting the particular control 206h from the controls 226b, the user can select the phone book entry for Stacy's cell phone. In some implementations, labels 228a-228c (e.g., indicating home, cell and work) or other visual cues can be used to designate the types of information represented by different dimensions. In some implementations, other ways (e.g., highlighting) can be used to indicate groups of entries in different dimensions, e.g., instead of spaces shown between successive controls 226a, 226b and 226c.

In some implementations, when controls are presented in two dimensions, individual controls can be omitted or grayed out if a corresponding element does not exist. For example, there may be no visible line displayed as a control if a person (e.g., Stacy) does not have a home number, e.g., as indicated by a gap 230 in the controls 226a.

Figure 3A:
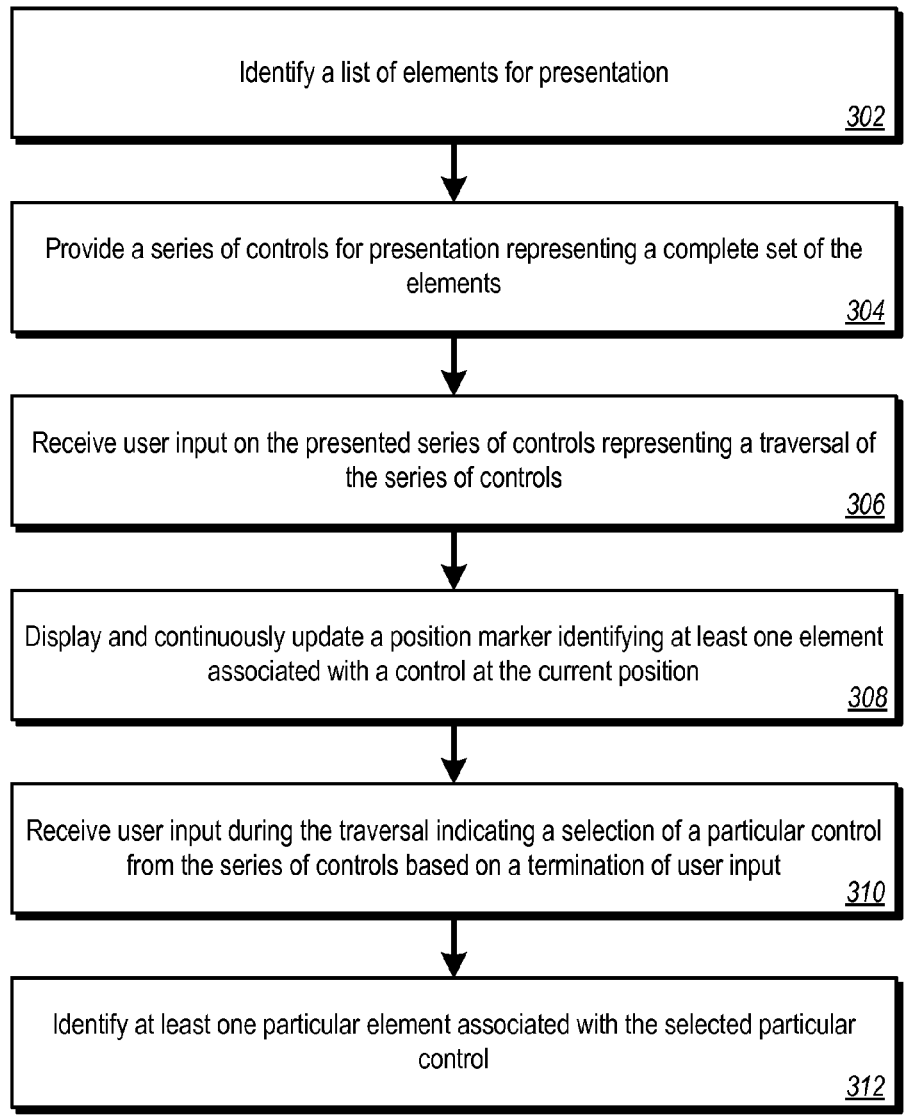
FIG. 3A is a flowchart of an example method for presenting a leaf-through representation of a list.

FIG. 3A is a flowchart of an example method 300 for presenting a leaf-through representation of a list. For clarity of presentation, the description that follows generally describes method 300 in the context of FIGS. 1 through 2I. However, it will be understood that the method 300 can be performed, for example, by any other suitable system, environment, software, and hardware, or a combination of systems, environments, software, and hardware as appropriate. For example, the client device 130 and/or its components can be used to execute the method 300, e.g., using information accessed from the content server 110.

At 302, a list of elements is identified for presentation. For example, the list presenter 132 can identify elements from the list elements 144 that are to be presented on the client device 130. If the user is to be presented an address list, for example, the list presenter 132 can access addresses from the list elements 144 that are needed for presentation of the address list to the user. In some implementations, identifying the list of elements can be in response to a request for a list of elements, e.g., in an application that presents lists of elements to a user and processes user actions associated with the list.

At 304, a series of controls is provided for presentation. The series of controls represent a complete set of the elements, including at least first and last elements in the list of elements that are accessible without paging or scrolling to another screen. For example, the list presenter 132 can present the series of controls 206 on the computer device 202. Initially, the series of controls 206 can appear as shown in FIG. 2B, e.g., before the user has begun interacting with the address book 204. The number, orientation and presentation mode for the series of controls 206 can depend on the number of elements (e.g., addresses) in the address book 204 and the display capabilities of the computer device 202.

In some implementations, providing the series of controls representing the complete set of the elements includes selecting a number of controls to be presented in the series of controls. The selection is based at least in part on a number of elements in the complete set of elements and display capabilities of a device on which the series of controls are to be displayed. For example, if there are 325 addresses in the address book, the list presenter 132 can determine that approximately 65 vertical lines can be used for the series of controls 206, where each line represents five addresses. Further, the left-most and right-most controls in the list in the series of controls 206 can represent the first five addresses and last five addresses, respectively, in the address book 204. As a result, the entire address book 204 is presented and selectable by the user.

In some implementations, the number of individual controls selected for the series of controls 206 can be based on segmenting or grouping the elements into groups that may be more logical to the user. For entries in a large address, for example, the first-level controls in the series of controls 106 can correspond to one or more letters of the alphabet (e.g., A, B, C, . . . W-Z). In another example, if the series of controls 206 is being used to represent dates, each individual control presented at a first level of searching can correspond to a group of elements that is grouped by month(s) and/or year(s). Doing this can result in presenting position markers 210 with cleaner boundaries instead of dividing the entire set of elements into proportional groups that may create disjoint boundaries that may be more cumbersome to a user.

In some implementations, the series of controls 206 includes annotations that describe and represent groupings of elements associated with the controls. Each annotation describes and represents a different grouping of the groupings. For example, referring to FIG. 2E, the annotations 216 identify groupings of elements of the address book 2004 that have the same first letter of the last name. Each of the annotations 216, for example, can be associated with one or more letters of the alphabet. The letters of the alphabet may or may not be displayed on the annotations. In another example, if a list is being presented that includes time-based elements, the annotations can be calendar years, specific months, ranges of times, other time intervals, or combinations of periods of time. In some implementations, the annotations include color-coding of one or more sets of controls. The color-coding is based on common characteristics shared by elements associated with different subsets of elements associated with controls within the series. As an example, annotations with color coding can be used to annotate entries in a task list to designate and group entries by priority. Other ways of grouping and annotating entries can be used, including, for example, grouping by region. In this example, entries can be grouped by country, state, city, county or other region(s).

At 306, user input on the presented series of controls is received representing a traversal of the series of controls. The user input includes an uninterrupted selection of at least part of the series of controls. For example, using touch input, the user can begin interacting with the address book 204. The touch input can begin, for example, when the user touches the series of controls 106 at any location, e.g., on any part of any one of the vertical lines. Traversal of the list can continue, for example, as the user touch-slides through the series of controls 106, e.g., to the left and right along the horizontal presentation of the vertical lines. As long as the user is touching the series of controls 106, the traversal continues.

In some implementations, the series of controls 206 are presented as vertical lines, and the traversal occurs substantially horizontally. For example, each control of the series of controls 206 can be a vertical line representing a page of an address book.

In some implementations, the user input is provided using a maintained touch input. For example, uninterrupted selection of the series of controls 106 can be provided using a touch input on a touch screen, e.g., on a mobile device, tablet computer, or other computerized device having a touch screen. Other ways can also be used to provide the user input, such as using a mouse to provide a drag-like operation, e.g., by holding down a mouse button while moving the mouse on a mouse pad.

At 308, during the traversal and depending on a current position of the user input in relation to the series of controls, a position marker is displayed and continuously updated that identifies at least one element associated with a control at the current position. For example, in FIG. 2, the position marker 210 indicates that the user, using touch input 208, has traversed the series of controls 206 to the position at which the particular control 206a is selected. In this example, the one element that is associated with the particular control 206a is the address book entry for "Stewart" as indicated in the position marker 210. As the user touch-slides to the left and right using touch input 208, the information displayed in position marker 210 changes accordingly, e.g., replacing "Stewart" with information associated with the currently-positioned (e.g., pre-selected) entry.

At 310, user input is received during the traversal indicating a selection of a particular control from the series of controls based on a termination of user input. The selection of the particular control is based on a position relative to the series of controls represented by the user input. For example, the user can select a particular entry in the address book 204 by terminating the touch input 208 (e.g., by lifting the touching finger, releasing a mouse button, etc.) when the desired address book entry is identified by the information displayed in the position marker 210.

In some implementations, the selection of a particular control from the series of controls is based, at least in part, on techniques that determine an intended user selection using touch input and based on position and time. For example, experiments have shown that when a user lifts a finger at the end of touch input, the act of lifting the finger may be uneven, e.g., not a straight upward motion. This variation can cause the selection of a particular one of the series of controls 106, for example, to be misconstrued, as the user's touch position changes slightly. In some implementations, to correct for this problem, determining the user's intended selection can be based at least in part on a finger touch location that occurred at a pre-determined moment before the end of touch input. For example, experiments have shown that a touch position that occurs 400 milliseconds before the release can signal the user's desired selection. This is because, before lifting the finger, the user usually stays on the desired element for a moment (e.g., 400 milliseconds) until recognizing it as the desired one. By using the user's touch location at a slightly earlier time in this way, for example, the touch input processor 134 can determine a more accurate intended selection for the user. The same and/or other techniques can be used for other types of positional input, such as mouse-based input in which the mouse may move slightly as a mouse button is released.

At 312, at least one particular element associated with the selected particular control is identified. For example, based on the particular control 206a selected, the touch input processor 134 can identify the corresponding entry (e.g., "Stewart") in the address book 204. "Stewart" can be the last name of an entry in the address book 204 for "James Stewart," for example, as the position marker 210 can display the "peek" information (e.g., just the last name) from the entry.

In some implementations, the user input is provided using touch input, and the release operation is a finger lift that signals an end to the traversal. Further, the method further comprises receiving additional touch input of the particular control representing a subsequent user selection of the particular control, and presenting detailed information associated with at least one element associated the selected particular control. As an example, once the user has ended the traversal by lifting the touching finger to select the particular control 206a, the user can tap the position marker 210, a designated location within the presented controls, or, in some implementations, anywhere on the screen). In some instances, tapping the position marker 210 may be preferred where the sizes of the respective controls are large enough to easily tap the position marker 210. In other instances, particularly where a large number of controls are presented, tapping nearby to the position marker 210, as well as any other suitable location on the screen of presented controls, may be sufficient to indicate a selection of the position marker 210. Doing this can result in the display of detailed information that is associated with the particular control 206a, such as displaying the complete address information for "James Stewart," by, for instance, providing a popup displayed over the list, a new or different screen and/or page, or in some other suitable way. In this way, after the user traverses the address book 204 and terminates touch input in order to select a particular entry, subsequently tapping the entry can cause the full information for the entry to be displayed.

Figure 3B:
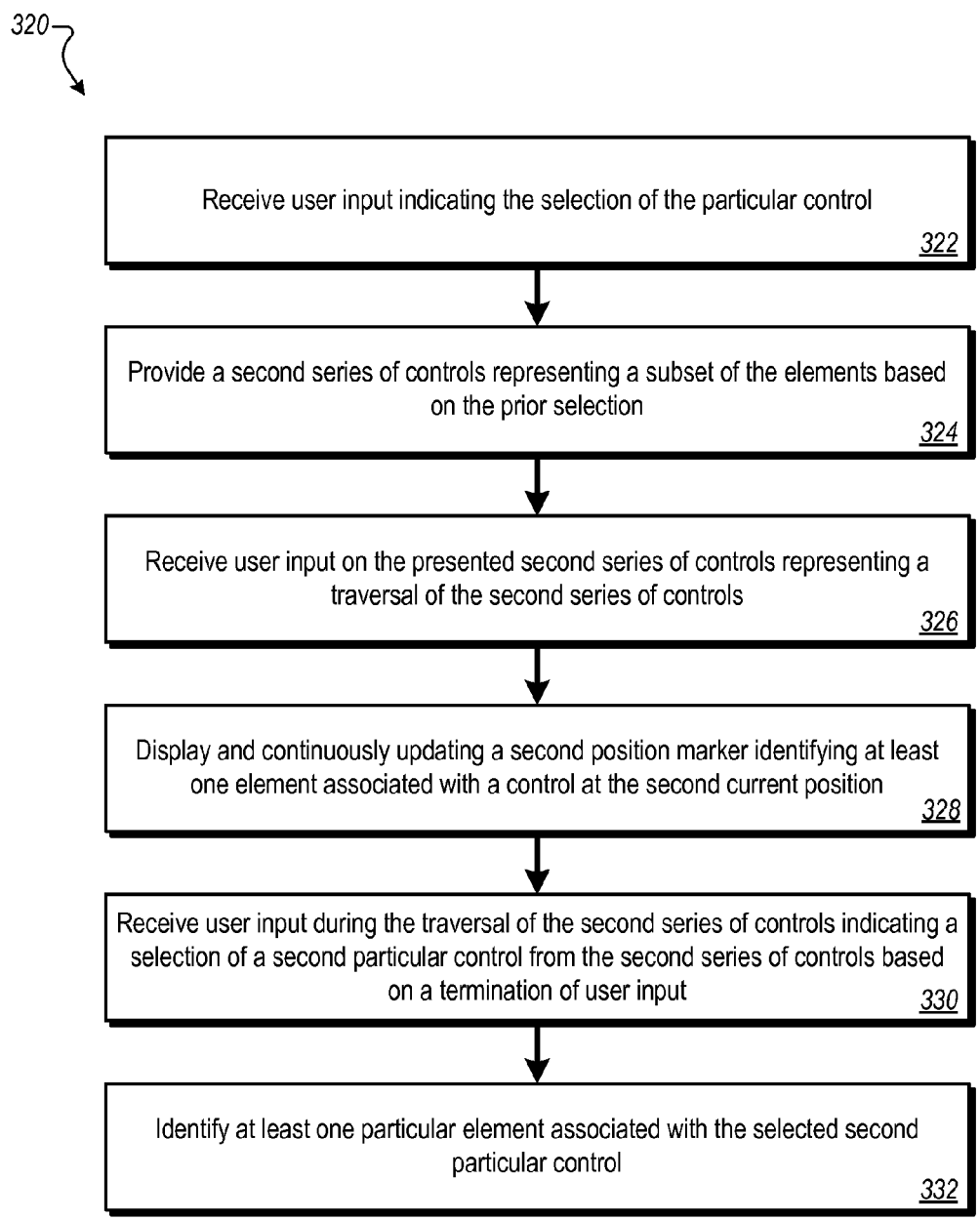
FIG. 3B is a flowchart of an example method for a second-level user selection from a leaf-through presentation of a list.

FIG. 3B is a flowchart of an example method 320 for a second-level user selection from a leaf-through presentation of a list. For example, the method 320 can be a continuation of the method 300 for use in a multi-level search or selection from a series of controls 106 representing a greater number of elements than can be processed during a single-level search. As such, the method 320 can be used when a particular control of the series of controls 106 represents more than one element. For clarity of presentation, the description that follows generally describes method 320 in the context of FIGS. 1 through 2I. However, it will be understood that the method 320 may be performed, for example, by any other suitable system, environment, software, and hardware, or a combination of systems, environments, software, and hardware as appropriate. For example, the client device 130 and/or its components can be used to execute the method 320, e.g., using information accessed from the content server 110.

At 322, user input is received indicating the selection of the particular control. For example, the touch input processor 134 can receive the user's selection of the particular control 206b that corresponds to the range of elements "Stanley-Talent".

At 324, a second series of controls is provided that represents a subset of the elements based on the prior selection. As an example, the list presenter 132 can present the series of controls 106 that are described with reference to FIG. 2D and correspond to controls for selecting among address book 204 entries "Stanley-Talent."

At 326, user input is received on the presented second series of controls representing a traversal of the second series of controls, the user input including an uninterrupted selection of at least part of the second series of controls. For example, referring to FIG. 2D, touch input 208 can be used by the user to traverse the series of controls 106.

At 328, during the traversal of the second series of controls and depending on a second current position of the user input in relation to the second series of controls, a second position marker is displayed and continuously updated that identifies at least one element associated with a control at the second current position. For example, during the traversal, the position marker 210 can be continuously updated (e.g., to display "Stewart") as the user traverses the list, e.g., at the location of the particular control 206c and at other positions.

At 330, user input is received during the traversal of the second series of controls indicating a selection of a second particular control from the second series of controls based on a termination of user input. The selection of the second particular control is based on a second position relative to the second series of controls represented by the user input. For example, the touch input processor 134 can determine that the user has terminated touch input 208 to select the particular control 206c corresponding to the address book 204 entry for "Stewart."

At 332, at least one particular element associated with the selected second particular control is identified. For example, the touch input processor 134 can determine that the user has used touch input 208 to select the particular control 206c corresponding to the address book 204 entry for "Stewart."

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional, fewer and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
identifying a list of elements for presentation;
providing only non-textual information associated with the elements, including providing a series of controls for simultaneous presentation, the series of controls representing a complete set of the elements, the complete set including at least first and last elements in the list of elements that are accessible without paging or scrolling to another screen;
receiving user input on the presented series of controls representing a traversal of the series of controls, the user input including an uninterrupted selection of at least part of the series of controls, the traversal being a maintained touch input across plural controls, and during the receiving, continuing to provide only non-textual information for particular elements represented by intervening controls used or skipped during the traversal;
during the traversal and depending on a current position of the user input in relation to the series of controls:
displaying and continuously updating a position marker identifying at least one element associated with a control at the current position, while continuing to provide only non-textual information for each element other than the at least one element; and
providing a peek feature associated with only the at least one particular element while continuing to provide only non-textual information for each of the other elements not including the at least one particular element, the peek feature identifying the at least one particular element, the peek feature being provided for display with the position marker and at a location substantially collocated with the current position;
receiving user input during the traversal indicating a selection of a particular control from the series of controls based on a termination of user input, the selection of the particular control based on a position relative to the series of controls represented by the user input; and
identifying at least one particular element associated with the selected particular control.

2. The method of claim 1, wherein the maintained touch input is a touch-slide input.

3. The method of claim 1, wherein the series of controls are vertical lines, and wherein the traversal occurs substantially horizontally.

4. The method of claim 1, wherein the user input representing the traversal of the series of controls is a drag operation, and wherein the termination is a release operation.

5. The method of claim 4, wherein the user input is provided using touch input, and wherein the release operation is a finger lift that signals an end to the traversal, the method further comprising:

receiving additional touch input of the particular control representing a subsequent user selection of the particular control; and presenting detailed information associated with the at least one element.

6. The method of claim 1, wherein the selection of a particular control from the series of controls is based, at least in part, on techniques that determine an intended user selection using touch input and based on position and time.

7. The method of claim 1, wherein the position marker identifies a group of elements associated with the current position, and the method further comprises, in response to the received user input indicating the selection of the particular control:

providing only non-textual information associated with the group of elements, including providing a second series of controls representing the group of elements;

receiving user input on the presented second series of controls representing a traversal of the second series of controls, the user input including an uninterrupted selection of at least part of the second series of controls;

during the traversal of the second series of controls and depending on a second current position of the user input in relation to the second series of controls:

displaying and continuously updating a second position marker identifying at least one element associated with a control at the second current position, while continuing to provide only non-textual information for each element of the group of elements other than the at least one element; and providing a peek feature associated with only the one particular element while continuing to provide only non-textual information for each of the other elements not including the one particular element, the peek feature identifying the one particular element and provided for display with the position marker and at a location substantially collocated with the current position;

receiving user input during the traversal indicating a selection of a second particular control from the second series of controls based on a termination of user input, the selection of the second particular control based on a second position relative to the second series of controls represented by the user input;

identifying at least one particular element associated with the selected second particular control.

8. The method of claim 1, wherein providing the series of controls representing the complete set of the elements includes selecting a number of controls to be presented in the series of controls based at least in part on a number of elements in the complete set of elements and display capabilities of a device on which the series of controls are to be displayed.

9. The method of claim 1, wherein providing the series of controls representing the complete set of the elements includes providing controls in two dimensions, wherein a first dimension represents a first attribute of the elements and a second dimension represents a second attribute of the elements, wherein traversal of the controls occurs in two dimensions, and wherein user selection of a particular control from the series of controls causes the identification of at least one particular element associated with the selected particular control based on the first and second dimensions.

10. The method of claim 1, wherein the position marker includes primary information displayed in a first way and secondary information displayed in a second way, wherein the primary information is associated with the element and matches information for at least one adjacent element in the list of elements, and wherein the secondary information associated with the element does not match information for the at least one adjacent element.

11. The method of claim 1, wherein the series of controls includes annotations that describe and represent groupings of elements associated with the controls, each annotation describing and representing a different grouping of the groupings.

12. The method of claim 11, wherein annotations include color-coding of one or more sets of controls, the color-coding based on common characteristics shared by elements associated with different subsets of elements associated with controls within the series.

13. A computer-program product, the computer program product comprising computer-readable instructions embodied on tangible, non-transitory media, the instructions operable when executed by at least one computer to:

identify a list of elements for presentation;

provide only non-textual information associated with the elements, including providing a series of controls for simultaneous presentation, the series of controls representing a complete set of the elements, the complete set including at least first and last elements in the list of elements that are accessible without paging or scrolling to another screen;

receive user input on the presented series of controls representing a traversal of the series of controls, the user input including an uninterrupted selection of at least part of the series of controls, the traversal being a maintained touch input across plural controls, and during the receiving, continue to provide only non-textual information for particular elements represented by intervening controls used or skipped during the traversal;

during the traversal and depending on a current position of the user input in relation to the series of controls:

display and continuously update a position marker identifying at least one element associated with a control at the current position, while continuing to provide only non-textual information for each element other than the at least one element; and provide a peek feature associated with only the at least one particular element while continuing to provide only non-textual information for each of the other elements not including the at least one particular element, the peek feature identifying the at least one particular element, the peek feature being provided for display with the position marker and at a location substantially collocated with the current position;

receive user input during the traversal indicating a selection of a particular control from the series of controls based on a termination of user input, the selection of the particular control based on a position relative to the series of controls represented by the user input;

identify at least one particular element associated with the selected particular control.

14. The computer-program product of claim 13, wherein the maintained touch input is a touch-slide input.

15. The computer-program product of claim 13, wherein the series of controls are vertical lines, and wherein the traversal occurs substantially horizontally.

16. The computer-program product of claim 13, wherein the user input representing the traversal of the series of controls is a drag operation, and wherein the termination is a release operation.

17. A system, comprising:
memory operable to store content, including static and dynamic content; and
at least one hardware processor interoperably coupled to the memory and operable to perform instructions to:
identify a list of elements for presentation;
provide only non-textual information associated with the elements, including providing a series of controls for simultaneous presentation, the series of controls representing a complete set of the elements, the complete set including at least first and last elements in the list of elements that are accessible without paging or scrolling to another screen;
receive user input on the presented series of controls representing a traversal of the series of controls, the user input including an uninterrupted selection of at least part of the series of controls, the traversal being a maintained touch input across plural controls, and during the receiving, continue to provide only non-textual information for particular elements represented by intervening controls used or skipped during the traversal;
during the traversal and depending on a current position of the user input in relation to the series of controls:
display and continuously update a position marker identifying at least one element associated with a control at the current position, while continuing to provide only non-textual information for each element other than the at least one element; and
provide a peek feature associated with only the at least one particular element while continuing to provide only non-textual information for each of the other elements not including the at least one particular element, the peek feature identifying the at least one particular element, the peek feature being provided for display with the position marker and at a location substantially collocated with the current position;
receive user input during the traversal indicating a selection of a particular control from the series of controls based on a termination of user input, the selection of the particular control based on a position relative to the series of controls represented by the user input;
identify at least one particular element associated with the selected particular control.

18. The system of claim 17, wherein the series of controls are vertical lines, and wherein the traversal occurs substantially horizontally.

19. The system of claim 17, wherein the user input representing the traversal of the series of controls is a drag operation, and wherein the termination is a release operation.

20. The method of claim 1, wherein the complete set of the elements is available for searching using the series of controls.

21. The method of claim 1, wherein identifying the at least one particular element includes presenting only index information associated with the at least one particular element.

\* \* \* \* \*